United States Patent
Tsirkin et al.

(10) Patent No.: US 11,249,782 B2
(45) Date of Patent: Feb. 15, 2022

(54) MANAGEABLE EXTERNAL WAKE OF VIRTUAL MACHINES

(71) Applicant: RED HAT ISRAEL, LTD., Raanana (IL)

(72) Inventors: Michael Tsirkin, Lexington, MA (US); Dor Laor, Tel Aviv (IL)

(73) Assignee: Red Hat Israel Ltd., Raanana (IL)

( * ) Notice: Subject to any disclaimer, the term of this patent is extended or adjusted under 35 U.S.C. 154(b) by 0 days.

(21) Appl. No.: 16/193,442

(22) Filed: Nov. 16, 2018

(65) Prior Publication Data

US 2019/0087219 A1 Mar. 21, 2019

Related U.S. Application Data

(60) Division of application No. 15/042,775, filed on Feb. 12, 2016, now Pat. No. 10,146,568, which is a continuation of application No. 15/005,844, filed on Jan. 25, 2016, now Pat. No. 10,162,662, which is a division of application No. 13/407,706, filed on Feb. 28, 2012, now Pat. No. 9,262,195.

(51) Int. Cl.
*G06F 9/455* (2018.01)

(52) U.S. Cl.
CPC ............ *G06F 9/45558* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,287,197 B2* | 10/2007 | Bennett | G06F 9/45533 714/38.13 |
| 8,185,893 B2 | 5/2012 | Hyser et al. | |
| 8,544,010 B2* | 9/2013 | Huang | G06F 9/544 718/102 |
| 2005/0246453 A1* | 11/2005 | Erlingsson | G06F 9/45558 710/1 |
| 2006/0123416 A1* | 6/2006 | Bertolotti | G06F 9/4812 718/1 |
| 2008/0089338 A1 | 4/2008 | Campbell et al. | |
| 2008/0201710 A1* | 8/2008 | Anderson | G06F 1/3209 718/1 |

(Continued)

OTHER PUBLICATIONS

VMware KB, Hibernation gets automatically enabled when booting into native Windows 7 64 bit boot camp partition (2046009), <kb.vmware.com/selfservice/microsites/search.do?language=en_US&cmd=displayKC&externalId=2046009>, Knowledge Base, retrieved on Jan. 6, 2016, 2 pages.

(Continued)

*Primary Examiner* — Kenneth Tang
(74) *Attorney, Agent, or Firm* — Lowenstein Sandler LLP

(57) ABSTRACT

Implementations of the disclosure describe manageable external wake of virtual machines. In one implementation, a method of the disclosure includes receiving, by a processor of a computer system, a message generated by a hardware device of the computer system while a virtual machine that is hosted by the computer system is asleep. The method further includes determining, by the processor, whether to wake the virtual machine in view of a hardware event of the hardware device that generated the message.

8 Claims, 5 Drawing Sheets

(56) References Cited

U.S. PATENT DOCUMENTS

| | | | |
|---|---|---|---|
| 2009/0172443 A1* | 7/2009 | Rothman | G06F 1/3209 |
| | | | 713/323 |
| 2010/0165897 A1 | 7/2010 | Sood | |
| 2010/0218183 A1* | 8/2010 | Wang | G06F 1/3228 |
| | | | 718/1 |
| 2011/0010713 A1* | 1/2011 | Matsumoto | G06F 9/4881 |
| | | | 718/1 |
| 2011/0047535 A1 | 2/2011 | Polakam et al. | |
| 2011/0072426 A1* | 3/2011 | Huang | G06F 9/544 |
| | | | 718/1 |
| 2011/0099267 A1 | 4/2011 | Suri et al. | |
| 2011/0153716 A1 | 6/2011 | Malakapalli et al. | |
| 2011/0153822 A1* | 6/2011 | Rajan | G06F 9/5055 |
| | | | 709/225 |
| 2011/0191610 A1* | 8/2011 | Agarwal | G06F 1/3203 |
| | | | 713/310 |
| 2011/0296411 A1* | 12/2011 | Tang | G06F 9/45545 |
| | | | 718/1 |
| 2012/0233331 A1* | 9/2012 | Voccio | G06F 3/0665 |
| | | | 709/226 |
| 2012/0331465 A1* | 12/2012 | Tanikawa | G06F 9/5077 |
| | | | 718/1 |
| 2013/0042242 A1* | 2/2013 | Kagan | G06F 9/4812 |
| | | | 718/1 |
| 2013/0097435 A1* | 4/2013 | Seguin | G06F 9/45558 |
| | | | 713/310 |
| 2013/0179895 A1 | 7/2013 | Calder et al. | |
| 2014/0208132 A1* | 7/2014 | Cheston | G06F 1/26 |
| | | | 713/310 |
| 2016/0246639 A1* | 8/2016 | Voccio | G06F 3/0647 |

OTHER PUBLICATIONS

Wu, Hibernating a guest VM on Hyper-V, <social.technet.microsoft.com/forums/windowsserver/en-US/82b8c77f-1dac-4809-81ba-2f99fc5ec86b/hibernating-a-guest-vm-on-hyperv>, Microsoft (MSFT CSG), retrieved on Jan. 6, 2016, 2 pages.

Armstrong, Hibernation under Virtual PC, <blogs.msdn.com/b/virtual_pc_guy/archive/2006/01/23/516119.aspx>, Ben Armstrong's Virtualization Blog, MSDN Blogs, retrieved on Jan. 6, 2016, 2 pages.

USPTO, Office Action for U.S. Appl. No. 15/042,775, dated Jul. 11, 2017.

USPTO, Final Office Action for U.S. Appl. No. 15/042,775, dated Dec. 20, 2017.

USPTO, Office Action for U.S. Appl. No. 15/042,775, dated Mar. 20, 2018.

USPTO, Advisory Action for U.S. Appl. No. 15/042,775, dated Feb. 23, 2018.

USPTO, Notice of Allowance for U.S. Appl. No. 15/042,775, dated Jul. 27, 2018.

* cited by examiner

MANAGEABLE EXTERNAL WAKE OF VIRTUAL MACHINES

CROSS-REFERENCE TO RELATED APPLICATIONS

This application is a divisional of U.S. patent application Ser. No. 15/042,775, filed Feb. 12, 2016, which is a continuation of U.S. patent application Ser. No. 15/005,844, filed Jan. 25, 2016, which is a divisional of U.S. patent application Ser. No. 13/407,706, filed Feb. 28, 2012 and issued as U.S. Pat. No. 9,262,195 on Feb. 16, 2016, wherein the contents of each of the above application are hereby incorporated by reference herein.

TECHNICAL FIELD

This disclosure relates to computer systems, and more particularly, to hibernation in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
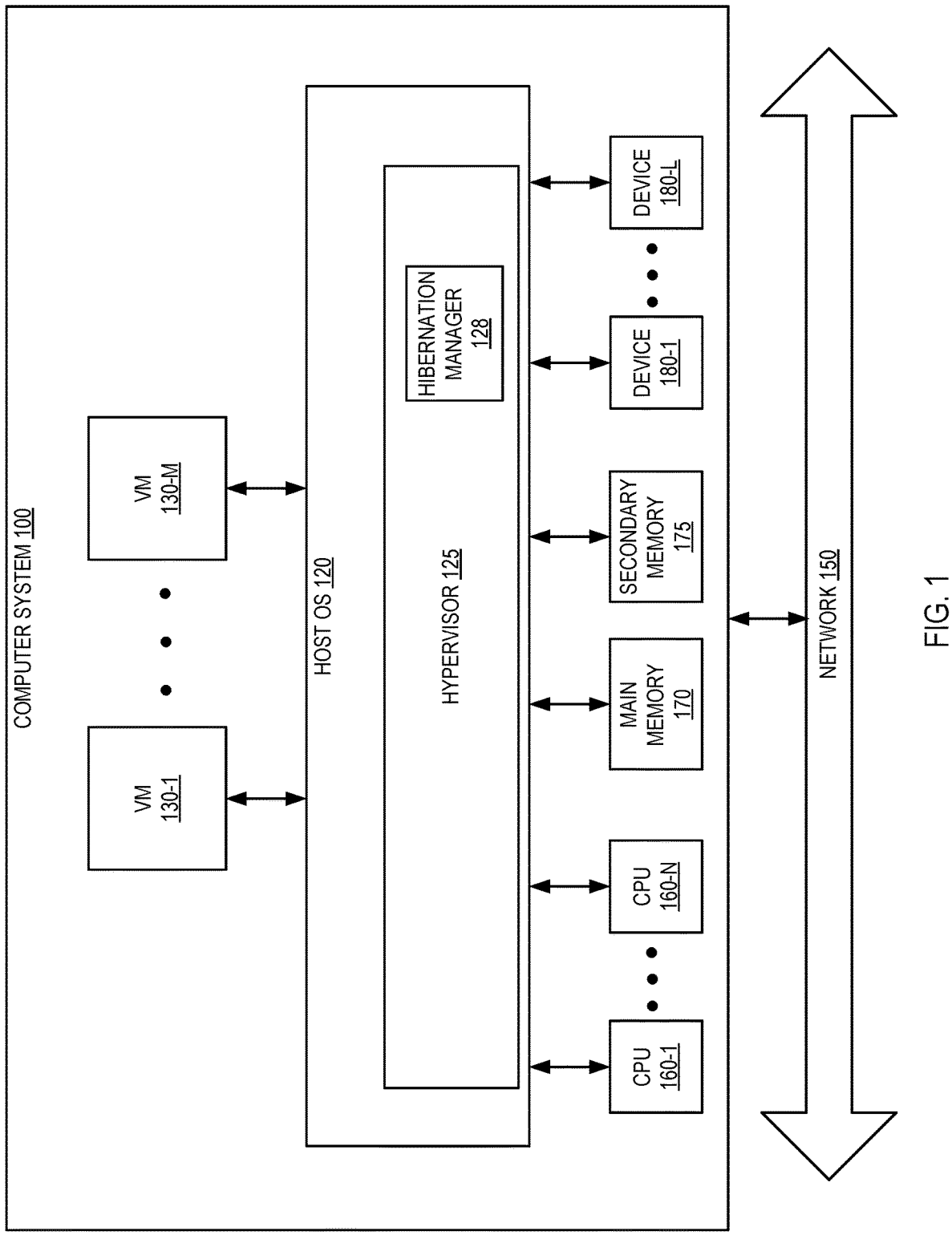
FIG. 1 depicts an exemplary computer system architecture, in accordance with an embodiment of the present invention.

Described herein is a system and method for waking hibernating virtual machines. Hibernation is a technique by which a physical machine is put to sleep (e.g., in response to a lack of activity, etc.) by the operating system in order to conserve power. Hibernation may involve stopping physical devices (e.g., network interface devices, CD-ROM drives, etc.) of the physical machine (e.g., by changing the devices' states from d0 to d1 or higher, etc.), stopping the central processing units (CPUs) of the physical machine (e.g., by one of the CPUs synchronizing with the other CPUs and all of the CPUs changing states from s0 to s1 or higher, etc.), storing the state of the physical machine to memory (e.g., random access memory [RAM], disk, etc.), and, finally, the operating system suspending itself.

Subsequently, upon receiving a wake event, the operating system wakes the physical machine, which may involve re-starting the CPUs (e.g., by changing the CPUs' states back to s0, etc.), re-starting the physical devices (e.g., by changing the devices' states back to d0, etc.), and loading the state of the physical machine back from memory.

In accordance with embodiments of the present invention, a host operating system (OS) may decide to wake a hibernating virtual machine in response to a message received by the host, such as an incoming networking packet (e.g., an Internet Protocol packet, etc.), a message associated with an external event (e.g., a hardware device fault, an interrupt, etc.), and so forth. More particularly, the host OS may decide to wake a hibernating VM based on one or more of the following:

the sender of the message;
a port number associated with the message;
a destination VM associated with the message;
a password in the message;
a cookie in the message; or
a sequence number in the message.

For example, upon receiving an incoming Internet Protocol (IP) packet, the host OS may decide whether to wake a hibernating VM based on the IP address of the sender, or on a port number to which the packet is directed, or both. As another example, an incoming packet might contain a password, and the host OS may decide whether to wake a hibernating VM based on whether this password matches an entry in a password whitelist. As yet another example, upon receiving a hardware fault message, the host OS may decide whether to wake a hibernating VM based on the sender of the message (i.e., the hardware device that generated the fault message).

Embodiments of the present invention are thus capable of providing intelligent waking of hibernating virtual machines, with greater flexibility and security compared to techniques of the prior art. For example, in contrast with the Wake-on-LAN technique, which requires a special-purpose "magic packet" for waking machines, embodiments of the present invention are capable of waking hibernating virtual machines in response to "regular" packets that are sent in accordance with an existing communication protocol (e.g., IP packets for sending data, TCP/IP acknowledgement packets, etc.). In addition, embodiments of the present invention can determine whether to wake a virtual machine based on particular properties of a packet, such as the sender of the packet and the destination port of the packet. Further, embodiments of the present invention can provide greater security and flexibility by considering data such as passwords, cookies, and sequence numbers contained in packets when determining whether to wake a virtual machine. Still further, embodiments of the present invention can decide to wake a hibernating virtual machine in response to messages other than networking packets, such as faults generated by hardware devices, interrupts, and so forth.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "changing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160, main memory 170, which may include volatile memory devices (e.g., random access memory (RAM)), non-volatile memory devices (e.g., flash memory), and/or other types of memory devices, secondary memory 175 (e.g., one or more hard disk drives, solid-state drives, etc.), and one or more devices 180 (e.g., a network interface device, a CD-ROM drive, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for a set of virtual machines (VMs) 130-1 through 130-M and that manages the execution of these virtual machines. In accordance with this embodiment, hypervisor 125 includes a hibernation manager 128 that is capable of determining when it might be advantageous to wake one or more virtual machines 130-1 through 130-M that are hibernating, and of waking the virtual machines accordingly, as described below with respect to FIG. 4. It should be noted that in some alternative embodiments, hypervisor 125 may be external to host OS 120, rather than embedded within host OS 120.

Each virtual machine (VM) 130 is a software implementation of a machine that executes programs as though it were an actual physical machine. Virtual machine (VM) 130 is described in more detail below with respect to FIG. 2.

Figure 2:
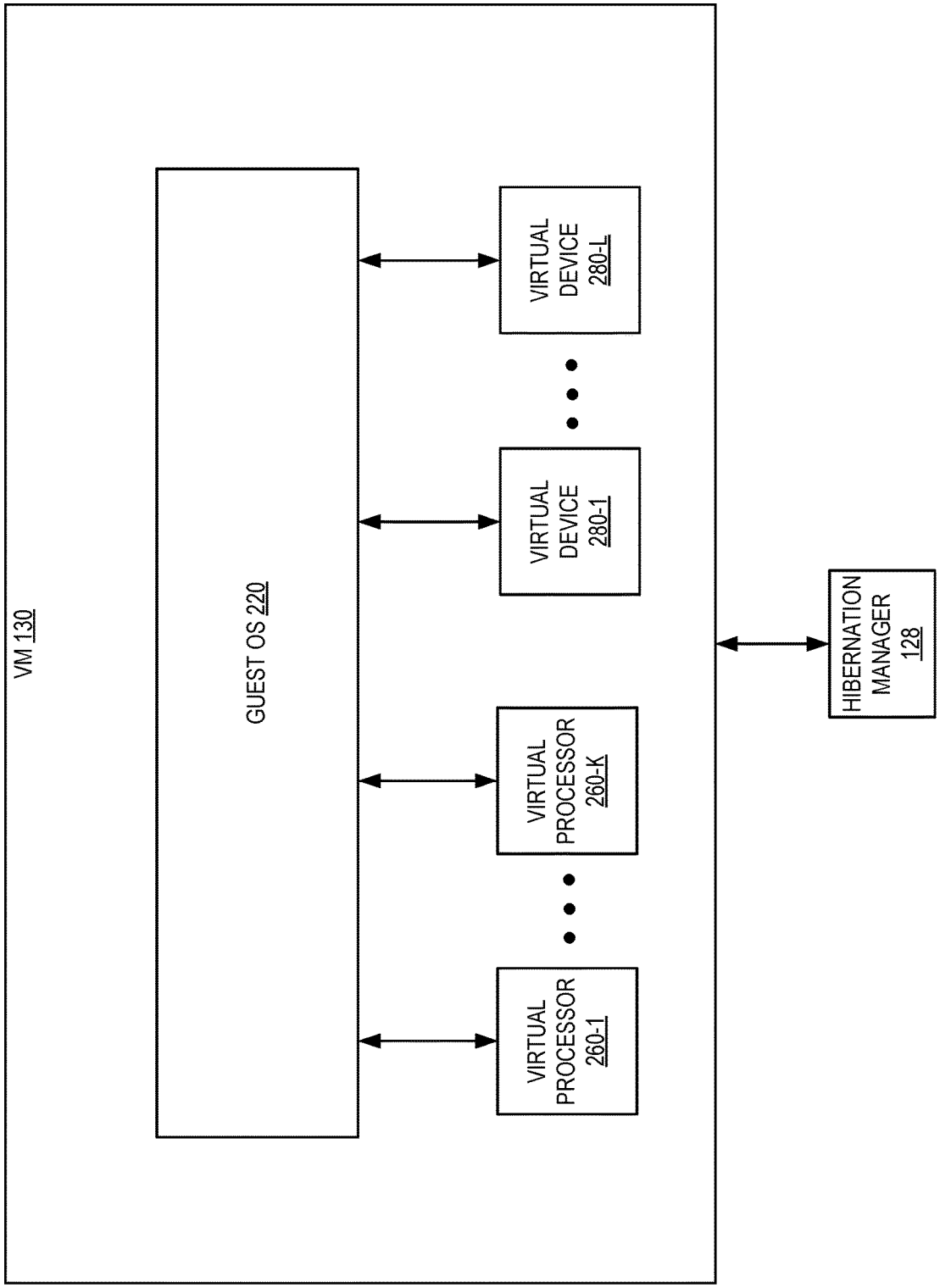
FIG. 2 depicts a block diagram of the salient elements of a virtual machine, in accordance with an embodiment of the present invention.

FIG. 2 depicts a block diagram of the salient elements of virtual machine (VM) 130, in accordance with an embodiment of the present invention. As shown in FIG. 2, virtual machine 130 comprises a guest operating system (OS) 220, one or more virtual processors 260, and one or more virtual devices 280.

Guest operating system (OS) 220 is software that manages computer resources and provides functions such as interprocess communication, scheduling, memory management, and so forth. It should be noted that guest OS 220 may or may not have power management capabilities.

Each virtual processor 260 is software that emulates a physical processor, and that maps to one of central processing units (CPU) 160, possibly in a many-to-one fashion. It should be noted that the number of virtual processors may or may not be the same as the number of CPUs (i.e., K may or may not equal N).

Each virtual device 280 is software that emulates a physical device and that maps to one of devices 180. In one embodiment, the mapping between virtual devices 280 and devices 180 is one-to-one, while in some other embodiments, the number of virtual devices 280 may not be the same as the number of devices 180, and/or the mapping may not be one-to-one. In one embodiment, hypervisor 125 manages these mappings in a transparent fashion, so that guest OS 220 and applications executing on virtual machine 130 interact with virtual processors 260 and virtual devices 280 as though they were actual physical entities.

Hibernation manager 128 is software that is capable of performing blocks 401 through 404 of FIG. 4 below, including waking one or more of virtual machines 130-1 through 130-M, and determining when it might be advantageous to wake the virtual machines. It should be noted that in some other embodiments, hibernation manager 128 might be within host OS 120, but external to hypervisor 125, rather than within hypervisor 125, as depicted in FIG. 2. The functionality of hibernation manager 128 is described in more detail below with respect to FIG. 4.

Figure 3:
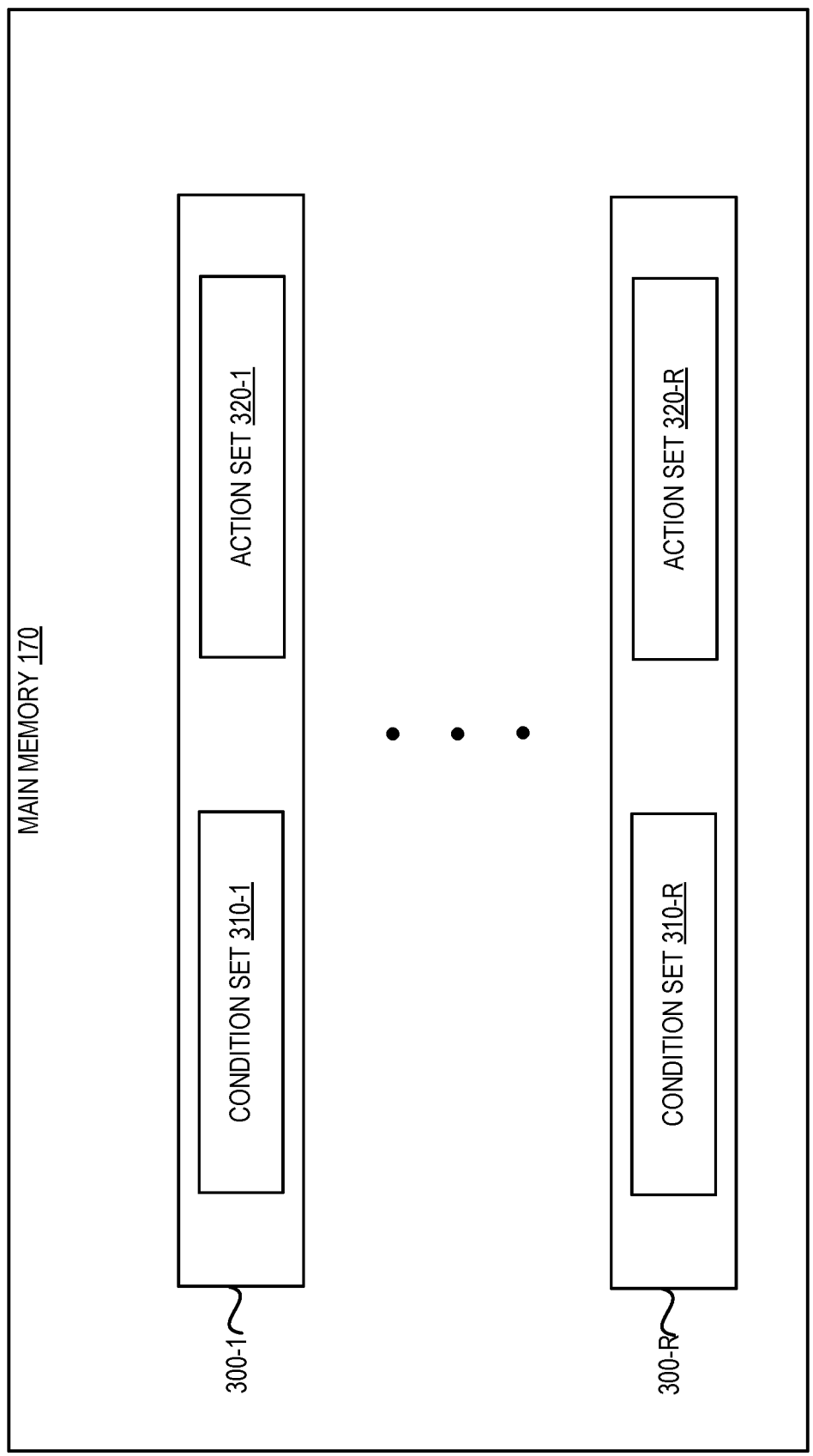
FIG. 3 depicts a block diagram of the salient contents of a host computer memory, in accordance with an embodiment of the present invention.

FIG. 3 depicts a block diagram of the salient contents of main memory 170, in accordance with an embodiment of the present invention. As shown in FIG. 3, main memory 170 stores rules 300-1 through 300-R, where R is a positive integer. Each rule 300-*i*, where i is an integer between 1 and R inclusive, has a set 310-*i* of one or more conditions, and a possibly-empty set 320-*i* of actions. In one embodiment, each condition of set 310-*i* may be an arbitrary logical expression pertaining to an incoming message, and may include one or more conjunctions (AND), disjunctions (OR), negations (NOT), comparator operations (e.g., equals, less than, etc.), and so forth.

In one embodiment, action set 320-*i* always contains the action "wake VM," and may also contain one or more additional actions, such as passing a value to the awakened VM, transmitting a notification signal to the awakened VM, performing some operation that is external to the VM, and so forth. It should be noted that in some other embodiments, the "wake VM" action might always be an implicit member of action set 320-*i*, in which case "wake VM" is performed automatically when condition set 310-*i* is satisfied, and in which case action set 320-*i* may be empty, indicating that no additional actions are to be performed. In one embodiment, rules 300 are used (e.g., by host OS 120, by hypervisor 125, by hibernation manager 128, etc.) to determine when to wake hibernating virtual machines, as described in detail below with respect to FIG. 4.

Figure 4:
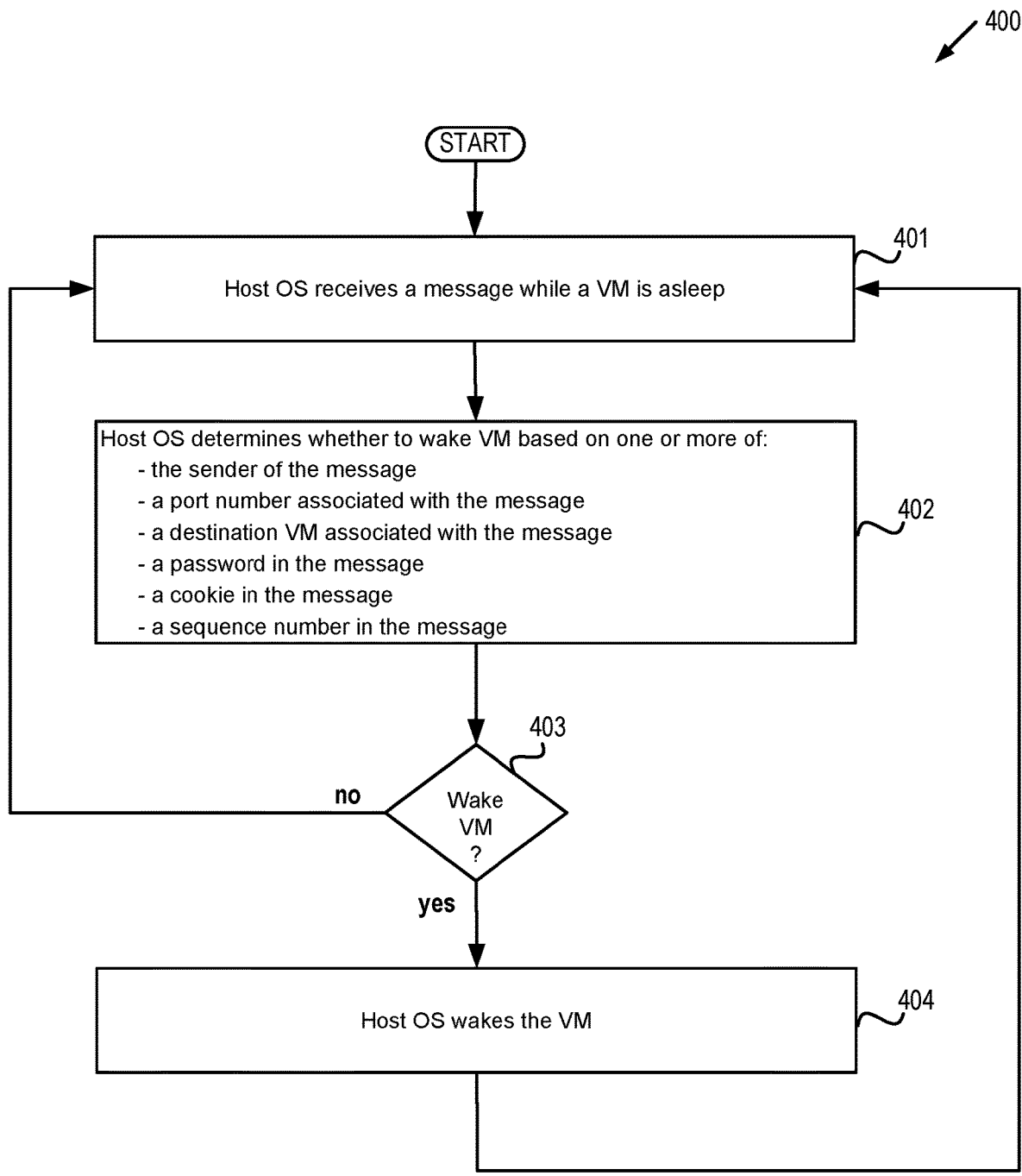
FIG. 4 depicts a flow diagram of one embodiment of a method for determining whether to wake a hibernating virtual machine.

FIG. 4 depicts a flow diagram of one embodiment of a method 400 for determining whether to wake a hibernating virtual machine 130. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1 (e.g., by host OS 120, by hypervisor 125 of host OS 120, by hibernation manager 128 of host OS 120, etc.), while in some other embodiments, some or all of the method might be performed by another machine. It should be noted that blocks depicted in FIG. 4 can be performed simultaneously or in a different order than that depicted.

At block 401, host operating system 120 receives a message while a virtual machine 130 is asleep. The message may be a networking packet (e.g., an Internet Protocol packet, an Ethernet frame, a Fibre Channel packet, etc.), or may be some other type of message, possibly generated by an event external to hypervisor 125 (e.g., a hardware fault, an interrupt, etc.).

At block 402, host operating system 120 determines whether to wake virtual machine 130 based on one or more of the following:
the sender of the message;
a port number associated with the message;
a destination VM associated with the message (for example, in the case of a hardware interrupt, a VM that has a virtual device mapped to the physical device generating the interrupt);
a password in the message;
a cookie in the message (e.g., a Transmission Control Protocol [TCP] SYN cookie, a TCP transaction cookie, a session cookie, a persistent cookie, a secure cookie, a HttpOnly cookie, etc.); or
a sequence number in the message (e.g., a TCP sequence number, etc.).

In some embodiments, this determination may be performed by checking whether the incoming message satisfies any of condition sets 310 of FIG. 3, while in some other embodiments, this determination may be performed in some other fashion, such as via logic of host OS 120 that is not formally organized into condition/action rules, via a dedicated executable with hard-coded logic run by host OS 120, via execution of a rule-based engine that is embedded in hypervisor 125, and so forth. It should be noted that the "sender" of a message may depend on the type of message. For example, for a networking packet, the sender may refer to the IP address at which the packet originated, a particular user at the IP address, etc. Similarly, for messages such as hardware device faults or interrupts, the sender may refer to an address, a file, a driver, etc. associated with the hardware device. It should also be noted that a message sequence number can also be considered a simple kind of cookie.

Block 403 branches based on the determination of block 402; if the determination was affirmative, execution continues at block 404, otherwise method 400 returns to block 401. At block 404, host OS 120 wakes virtual machine 130. In some embodiments, this may occur via a signal transmitted by hypervisor 125 to virtual machine 130, resulting in operations such as loading the state of stopped virtual processors 260, re-starting stopped virtual processors 260, re-starting stopped virtual devices 280, and so forth, while in some other embodiments, host OS 120 might wake virtual machine 130 in some other fashion. After block 404, method 400 returns to block 401.

Figure 5:
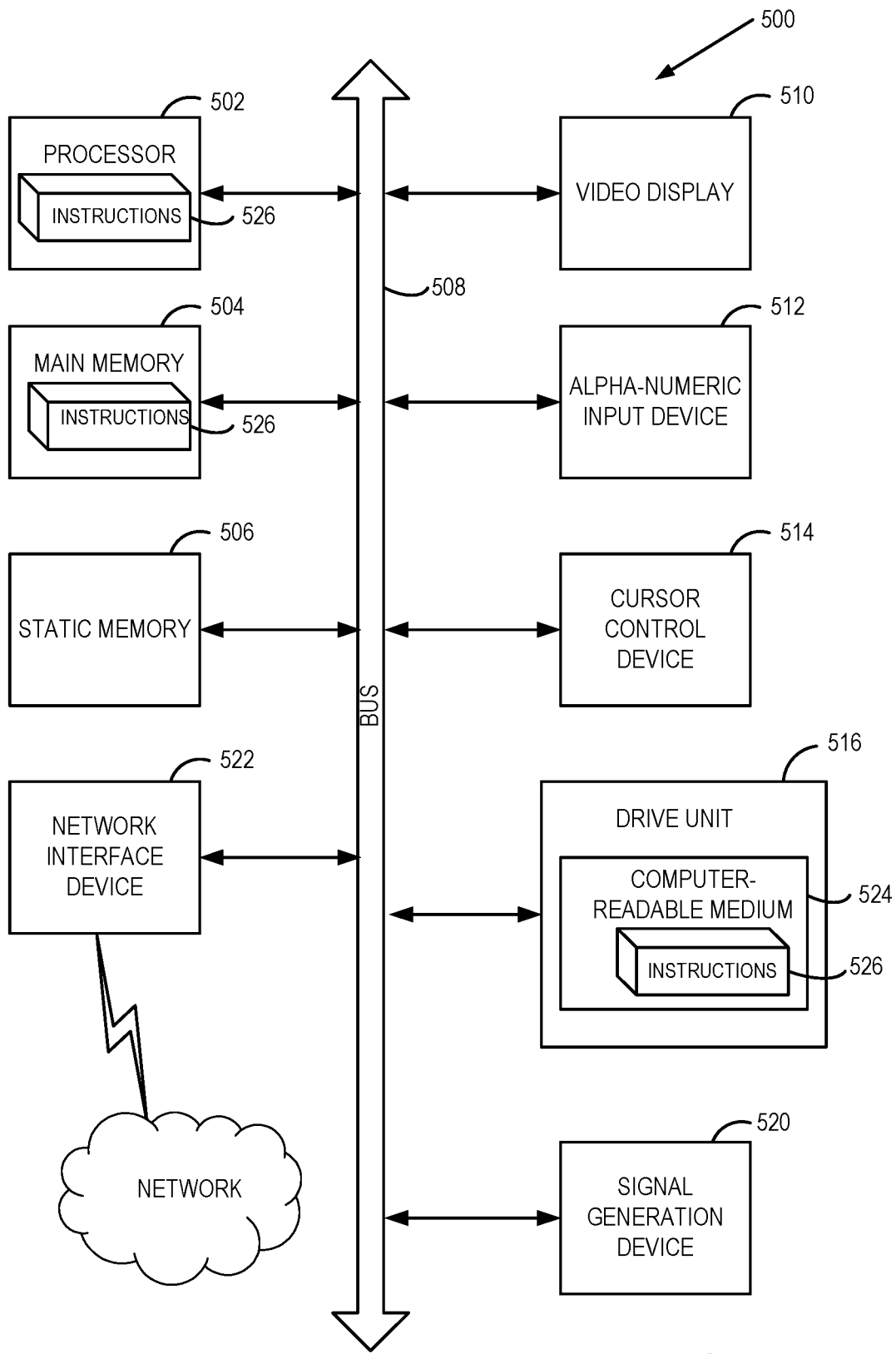
FIG. 5 depicts a block diagram of an illustrative computer system operating in accordance with embodiments of the invention.

FIG. 5 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the method of FIG. 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
   a memory;
   a hardware device communicably coupled to the memory; and
   a computer system comprising a processor operatively coupled to the hardware device and the memory to:
   receive, from a hardware device, a hardware fault message corresponding to a fault generated by the hardware device while a virtual machine that is hosted by the computer system is hibernating;
   make a determination to wake the virtual machine by using a set of rules in view of a set of parameters of the hardware fault message, wherein the set of parameters comprises an identifier of the virtual machine as a destination virtual machine mapped to the hardware device that generated the hardware fault message, and an identifier of one or more of an address, a file, or a driver of the hardware device that generated the hardware fault message; and
   in response to making the determination to wake the virtual machine by using the set of rules, wake the virtual machine without sending a special-purpose packet.

2. The apparatus of claim 1, wherein the at least one parameter of the message further comprises a password in the hardware fault message.

3. The apparatus of claim 1, wherein the at least one parameter of the hardware fault message further comprises a cookie in the hardware fault message.

4. A method comprising:
   receiving, by a processor of a computer system from a hardware device of the computer system, a hardware fault message corresponding to a fault generated by the hardware device while a virtual machine that is hosted by the computer system is hibernating;
   making, by the processor, a determination to wake the virtual machine by using a set of rules in view of a set of parameters of the hardware fault message, wherein the set of parameters comprises an identifier of the virtual machine as a destination virtual machine mapped to the hardware device that generated the hardware fault message, and an identifier of one or more of an address, a file, or a driver of the hardware device that generated the hardware fault message; and
   in response to making the determination to wake the virtual machine by using the set of rules, waking, by the processing device, the virtual machine without sending a special-purpose packet.

5. The method of claim 4, wherein the at least one parameter of the hardware fault message further comprises a password in the hardware fault message.

6. The method of claim 4, wherein the at least one parameter of the hardware fault message further comprises a cookie in the hardware fault message.

7. A non-transitory computer readable storage medium having instructions stored therein that, when executed by a processor of a computer system, cause the processor to:
- receive, from a hardware device of a computer system, a hardware fault message corresponding to a fault generated by the hardware device a virtual machine that is hosted by the computer system is hibernating; and
- make a determination to wake the virtual machine using a set of rules in view of a set of parameters of the hardware fault message, wherein the set of parameters comprises an identifier of the virtual machine as a destination virtual machine mapped to the hardware device that generated the hardware fault message, and an identifier of one or more of an address, a file, or a driver of the hardware device that generated the hardware fault message; and
- in response to making the determination to wake the virtual machine by using the set of rules, wake the virtual machine without sending a special-purpose packet.

8. The non-transitory computer readable storage medium of claim 7, wherein the at least one parameter of the hardware fault message further comprises at least one of a password in the message or a cookie in the hardware fault message.

\* \* \* \* \*